Dec. 1, 1970          O. ENGELER                3,543,497
                 FORAGE HANDLING WAGON
Filed Feb. 23, 1968                         4 Sheets-Sheet 1

INVENTOR.
OTTO ENGELER
BY
Schapp & Hatch
ATTORNEYS

INVENTOR.
OTTO ENGELER
BY
Schapp & Hatch
ATTORNEYS

INVENTOR.
OTTO ENGELER
BY Schapp & Hatch
ATTORNEYS

United States Patent Office 3,543,497
Patented Dec. 1, 1970

3,543,497
FORAGE HANDLING WAGON
Otto Engeler, Orovada, Nev. 89425
Filed Feb. 23, 1968, Ser. No. 707,617
Int. Cl. A01d *87/04*
U.S. Cl. 56—345                         20 Claims

ABSTRACT OF THE DISCLOSURE

A self-propelled wagon for picking up and discharging forage material in the field, loading from and unloading same to storage, and comminuting the forage, having a longitudinal full width conveyor floor and a combination blower and comminuting beater, a flight conveyor from the beater-blower to the wagon bed, an articulated creeper composed of counteroscillating fingered bars pivoted at the top of the wagon, eccentric tined pickup reels interchangeably mounted on the flight conveyor and the creeper, an adjustable deflecting hood for the beater-blower, an adjustable stop for controlling the degree of comminution, and a fully opening tailgate on the end of the wagon opposite the creeper and flight conveyor.

BACKGROUND OF THE INVENTION

This invention relates to a forage handling wagon, and more particularly to a wagon adapted for pickup, comminution, and delivery of forage both in the field and from storage.

Moving-floor forage harvesters have been known to the art for a number of years, and many of them have been equipped with flail-type pickup reels which operated to whip the forage material up from the ground and toss or blow it into the wagon. As the wagon filled, a moving floor was driven to carry the forage back into the wagon, away from the flail.

Wagons of such design may be used to pick up a load of forage from a stack, but problems are encountered as the flail cuts into the bottom of the stack, through sudden toppling of the undercut forage onto the flail, resulting in jamming and uneven feeding. Furthermore, when such wagons are used for loading from a stack of forage material not requiring further comminution, undesirable comminution and blowing of chaff and other small particulate material occurs. Other problems encountered are the difficulty of adapting such wagons for field feeding, i.e., slow discharge of forage material, and the inability of the wagon to unload its cargo en masse for the greatest speed of operation.

SUMMARY OF THE INVENTION

The forage handling wagon of the present invention is self-propelled for the greatest flexibility of movement and to eliminate damage to the forage material by driving over it. A combination beater and blower operates to pick up the forage material from the ground, comminute it to the desired degree and project it into the body of the wagon. An adjustable stop mounted in a hood which surrounds the beater-blower cooperates with the radial element of the beater-blower to comminute the forage to the desired degree. The floor of the wagon is a conveyor bed so that the forage may be moved back in the wagon as it accumulates.

For use where comminuation is undesirable or not feasible in conjunction with pickup, as with an uneven ground surface, an eccentric tined pickup reel is mounted in place of the beater-blower at the distal end of a flight conveyor pivoted to one end of the wagon. The pickup reel engages the forage and lifts it onto the flight conveyor, which in turn conveys it to the moving floor of the wagon.

The pivotal attachment of the flight conveyor allows adjustment of the desired height of pickup by the pickup reel or beater-blower and permits conversion of the wagon to the field feeding operation described below. Positioning the beater-blower at the distal end of the flight conveyor frame permits its position to be altered also for conversion between blower delivery of forage into the wagon as described above, and blower discharge of forage from the wagon to storage.

A conveyor of the reciprocating bar type, commonly referred to as a creeper or straw-walker, is pivoted to the wagon near the top adjacent the end to which the flight conveyor is attached. The reciprocating bars have tines attached to them protruding toward one face of the conveyor to engage forage material. The creeper is movable in a vertical plane so it can reach all parts of a stack of forage, and it has an eccentric pickup reel at its distal end similar to the reel at the distal end of the flight conveyor, to assist in drawing forage toward the creeper. The creeper in operation draws the forage material along its length toward the wagon. To do this, the reciprocating bars are not only reciprocated lengthwise but also in a direction perpendicular to the plane of the creeper conveyor, by being attached to a crankshaft. The creeper chews away at the upper levels of a stack of forage material, drawing it toward the wagon and serves also to feed a portion of the material from the upper part of the stack to the flight conveyor and either the beater-blower or the eccentric tined pickup reel at the end of the flight conveyor. When the wagon is being unloaded, the creeper conveyor assists in slowing the feed of material from the top and leading edge of the forage material in the wagon to the flight conveyor or beater-blower or both for smoother outflow of discharged material, and for prevention of jamming.

The wagon may be adapted for pickup of forage material where comminution is not desired by substituting the eccentric tined pickup reel for the removable beater-blower apparatus at the distal end of the flight conveyor. Removal of the beater-blower is also a step in the adaptation of the wagon for field feeding. In field feeding, forage is slowly discharged from the wagon, often as the wagon advances, to feed cattle in the field. For this purpose, the conveyor bed forming the floor of the wagon is operated to move the forage material contained in the wagon toward the flight conveyor. The creeper apparatus is moved down about its pivot until its tines confront the leading edge of the forage, and operated to move the forage back toward the wagon to keep the forage material from feeding out too fast. The flight conveyor and a side delivery conveyor are then operated slowly to discharge forage.

The end wall of the wagon at the end opposite the flight conveyor and creeper is capable of being fully opened up, so that the wagon may quickly discharge its entire load of forage, as for stacking purposes, by operating the conveyor forming the wagon floor while at the same time driving the wagon away from the stack so as to, in effect, "walk away" from the load.

Accordingly, it is a principal object of the present invention to provide a forage handling wagon of the character described which combines in one unit the operations of picking up windrowed forage material in the field, comminuting it, discharging it rapidly to storage, loading it rapidly and evenly from storage and discharging it slowly and evenly for field feeding, and which converts readily and simply between these modes of operation.

A further principal object of the present invention is to provide a forage handling wagon of the character described which is capable of picking up a windrow of forage material substantially as wide as the wagon.

Another object of the present invention is to provide a forage handling wagon of the character described which is capable of en masse unloading of the forage material carried.

A still further object of the present invention is to provide a forage handling wagon of the character described which will optionally comminute forage material to an adjustable degree upon pickup.

Yet another object of the present invention is to provide a forage handling wagon of the character described which is capable, after ejecting forage material en masse to form a stack, of building the stack higher by placing additional forage material atop the stack.

A further object of the present invention is to provide a forage handling wagon of the character described which will readily load forage material from a stack taller than the wagon.

An additional object of the present invention is to provide a forage handling wagon of the character described which is readily maneuverable and does not run over the forage material on the ground.

Further objects and advantages of the present invention will appear as the specification proceeds, and the new and useful features of the forage handling wagon will be fully defined in the claims attached hereto.

BRIEF DESCRIPTION OF THE DRAWINGS

The preferred form of the invention is illustrated in the accompanying drawings, forming part of this specification, in which.

Figure 1:
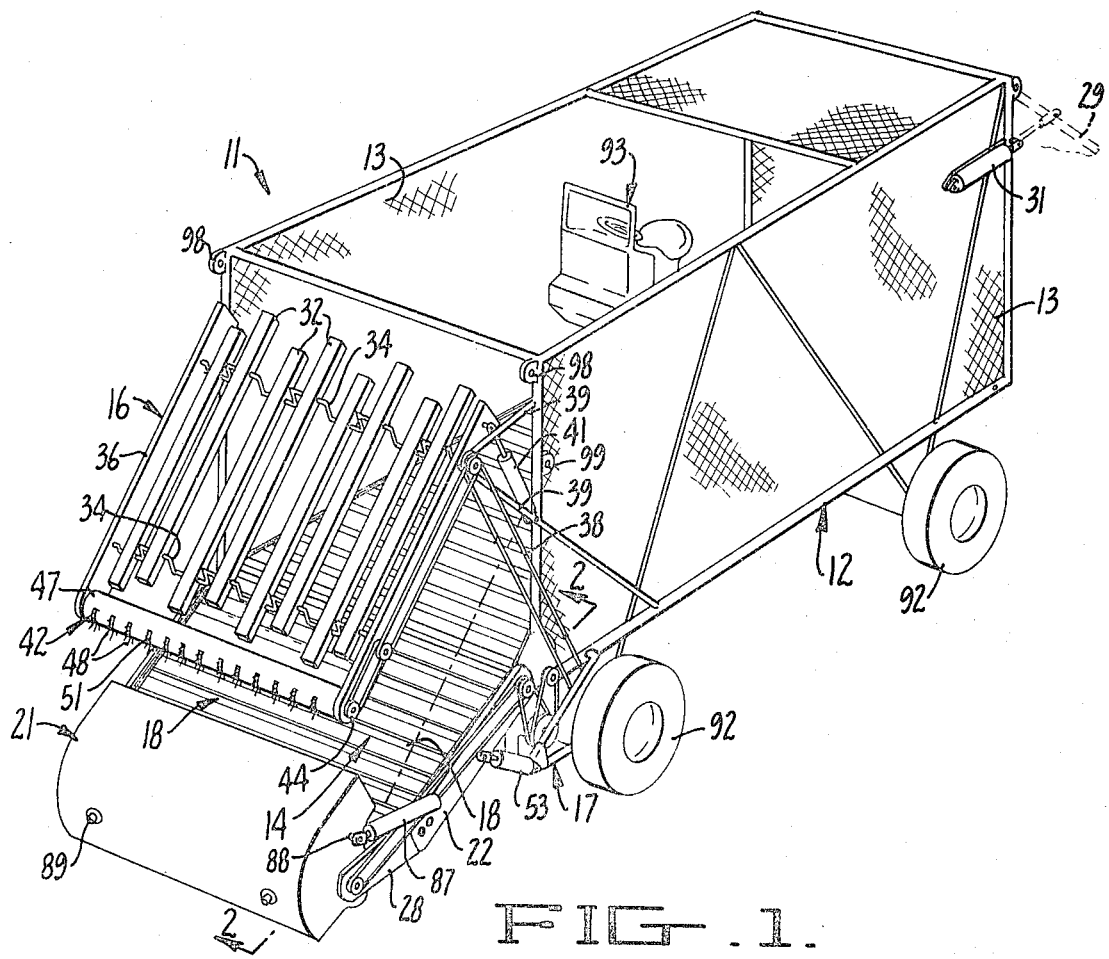
FIG. 1 is a perspective view of the feed handling apparatus of the present invention.

While only the preferred form of the invention has been shown, it should be understood that various changes or modifications may be made within the scope of the claims attached hereto, without departing from the spirit of the invention.

DESCRIPTION OF THE PREFERRED EMBODIMENT

Referring to the drawings in detail, it will be seen that the forage handling wagon 11 of the present invention includes a wheeled chassis 12 having upright forage-retaining side members 13, a conveyor 14 extending the width of the chassis 12 between the upright side members 13 and along the floor of the wagon 11, a creeper structure 16 pivotally mounted on the side members 13 at the top of the wagon and adjacent one end of the wagon for swinging motion about a horizontal axis transverse to the wagon, and motive means 17 for propelling the chassis 12, the creeper structure 16 and the conveyor 14.

A second conveyor 18 of width equal to the wagon 11 has one end attached to the chassis 12 adjacent the same end of the wagon 11 to which the creeper structure 16 is attached. The second conveyor 18 is attached to the chassis 12 so that it may pivot in a vertical plane about a horizontal axis transverse to the wagon 11 in a fashion similar to the pivotal motion of the creeper structure 16. The motive means 17 also operates the second conveyor 18 to convey forage material to and from the first conveyor 14. For pickup of forage material when comminution of the material is not desirable, a small pickup reel 19 may be mounted on the distal end of the second conveyor 18 and operated to place forage onto the second conveyor 18.

For comminuting the forage material when it is desired to blow the forage material into the wagon, a beater blower apparatus 21 is mounted on the distal end of the framework 22 which carries the second conveyor 18. The beater blower apparatus 21 includes a beater reel 23 extending substantially the width of the wagon 11 and journaled for freedom of rotation about a horizontal axis in arms 28 extending upward from the distal end of the framework 22. Beater elements 24 are attached to the beater reel 23 and extend out radially therefrom to engage forage, comminute it and project it tangentially of the beater reel 23.

A hood structure 26 encloses a portion of the beater reel 23 to deflect the forage in a desired direction from the beater reel 23, and breaker means 27 are mounted in the hood structure 26 to cooperate with the beater elements 24 in comminuting the forage. The motive means 17 supplies the motive power to operate the beater blower apparatus 21.

The end of the wagon 11 opposite the end to which the creeper structure 16 and the second conveyor 18 are attached is equipped with a movable end wall 29 pivotally attached at its top end to the side members 13. The end wall 29 may be moved between a position closing off that end of the wagon and a position substantially completely opening up that end of the wagon by a motive means 31, which may be a hydraulic or pneumatic cylinder. The movable end wall 29 facilitates the most rapid unloading of the wagon 11, as it may be opened fully and the conveyor 14 operated at a high rate of speed while the wagon 11 is driven away from the site at which the material is being unloaded, to effect "walk away" from the load of forage material contained in the wagon.

An important part of the versatility of the wagon 11 is provided by the creeper structure 16, which is formed of a number of elongated elements 32 which are aligned generally parallel to each other to form a generally planar structure. The elements 32 are mounted for reciprocation longitudnally and perpendicularly of the general plane of the creeper structure 16, and each element 32 is equipped with a row of forage-engaging fingers 33 along a portion of its length. As may best be seen in FIG. 6 the fingers 33 project toward one side of the general plane of the creeper structure 16.

As here shown the elements 32 are reciprocated to draw forage into the wagon 11 by means of a pair of spaced parallel crankshafts 34 having offsets in two directions 180° apart about the axis of the crankshaft. The crankshafts 34 are journaled on a framework 36 for rotation about generally horizontal axes transverse to the wagon 11, and each of the elements 32 is journaled on both crankshafts 34, with adjacent elements 32 being journaled on opposite offsets of the crankshaft 34. Pulleys 37 are mounted on the crankshafts 34 and connected by drive belts 38 by the motive means 17 so that the crankshafts 34 may be rotated.

Figure 6:
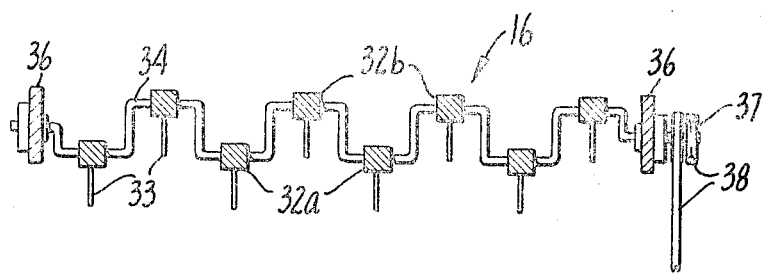
FIG. 6 is a fragmentary cross-sectional view, on an enlarged scale, taken substantially along the plane of line 6—6 of FIG. 3.

When the crankshafts 34 are rotated in a counter-clockwise direction as viewed in FIG. 1, the elements 32 are oscillated both longitudinally and perpendicularly with respect to the general plane of the creeper apparatus 16. One group of elements 32a as shown in FIG. 6 is swept downwardly so that its fingers 33 engage forage material and then swept in the direction of the body of the wagon 11 to draw the forage material into the wagon.

At the same time a second group of elements 32b is being drawn upwardly to disengage from the forage material and thrust forward and away from the wagon 11 to gain a new purchase on the forage material. The elements 32b then go through the cycle of motion just described for elements 32a, while elements 32a move as described above for elements 32b. While the crankshafts 34 are here shown having two offsets 180° apart, they could also be formed with three or four or more offsets distributed at equal angles about the axis of the crankshafts 34.

Figure 9:
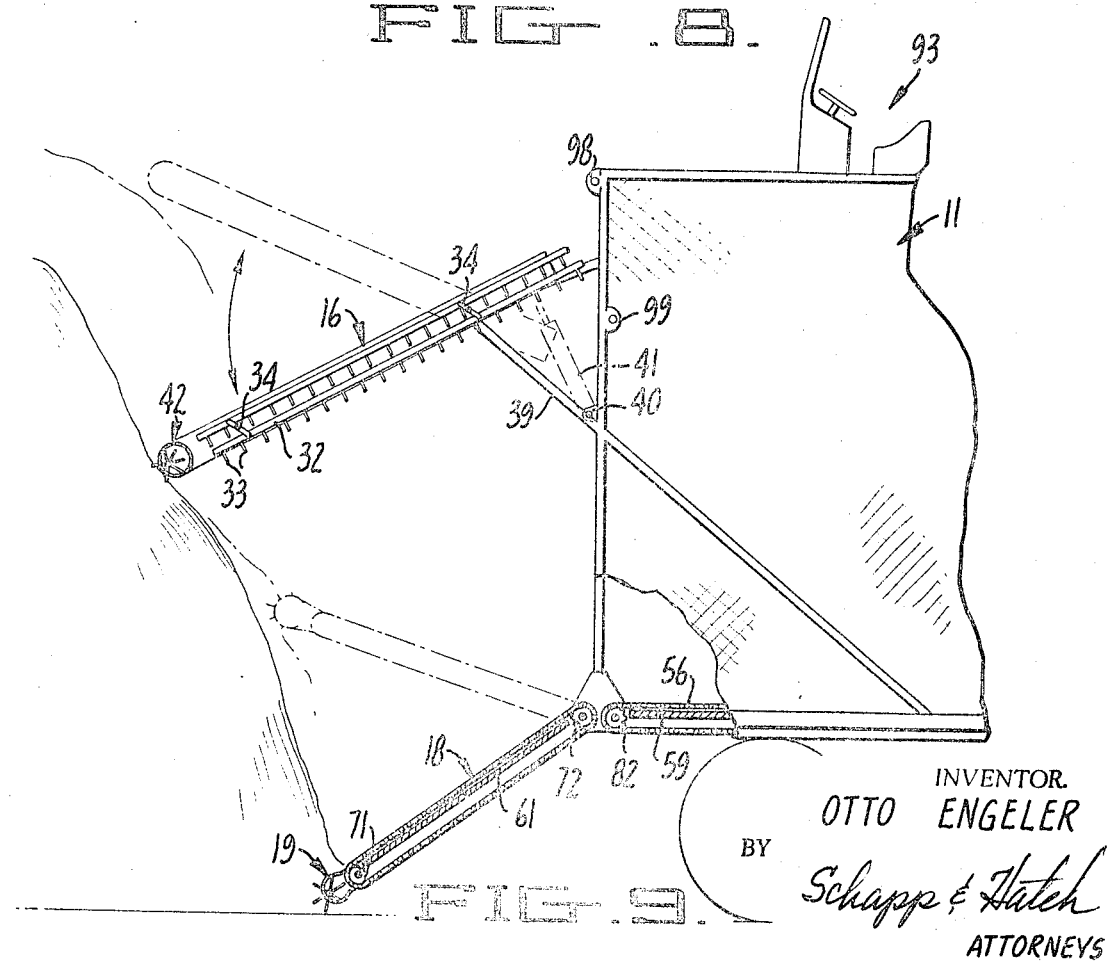
FIG. 9 is a side elevation view of a portion of the apparatus of the present invention in the stack-loading mode of operation.

In the present embodiment, the framework 36 is pivotally mounted on pairs of arms 39 extending from each of the side members 13 near the upper portion of the side members. A motive means 41, which may be a hydraulic or pneumatic cylinder, is attached to one end of the framework 36 and to the side member 13 so that the creeper structure 16 may be moved about the pivot point as shown in FIG. 9. The axis about which the creeper structure 16 pivots is made colinear with the axis of the innermost of the two crankshafts 34 so that the distance between the innermost of the pulleys 37 and the motive means 17 remains unchanged during movement of the creeper structure 16. The drive belt 38 leading from the innermost pulley 37 to the drive means 17 is thus not affected by the movement of the creeper structure.

A pickup reel 42 similar to the pickup reel 19 is attached to the end of the creeper structure 16 and driven by a drive belt 43 extending from the outermost pulley 37 to a pulley 44 attached to the pickup reel 42. This upper pickup reel 42 assists in feeding forage material to the creeper structure 16 by engaging the forage material as the pickup reel 42 rotates in a counterclockwise direction as seen in FIG. 9, and propelling the forage material in the direction of the teeth 33 of the creeper structure 16.

The pickup reels 19 and 42 each comprise a tined reel 46 journaled on the frameworks 22 and 36 respectively. The tined reels 46 are rotated about an axis generally transverse to the wagon 11, and they extend the full width of the wagon. A curved member 47 is disposed around a portion of the circumference of each of the tined reels 46 along their length, and the center of curvature of the hood member 47 is a line offset from and parallel to the axis of the tined reel 46. Tines 48 extend radially from the axle 49 of the tined reel 46, and the curved hood member 47 is pierced by circumferential slots 51 to allow the tines 48 to pass out from beneath the curved hood member 47 and to pass back beneath the hood member as the tined reel 46 rotates.

Figure 2:
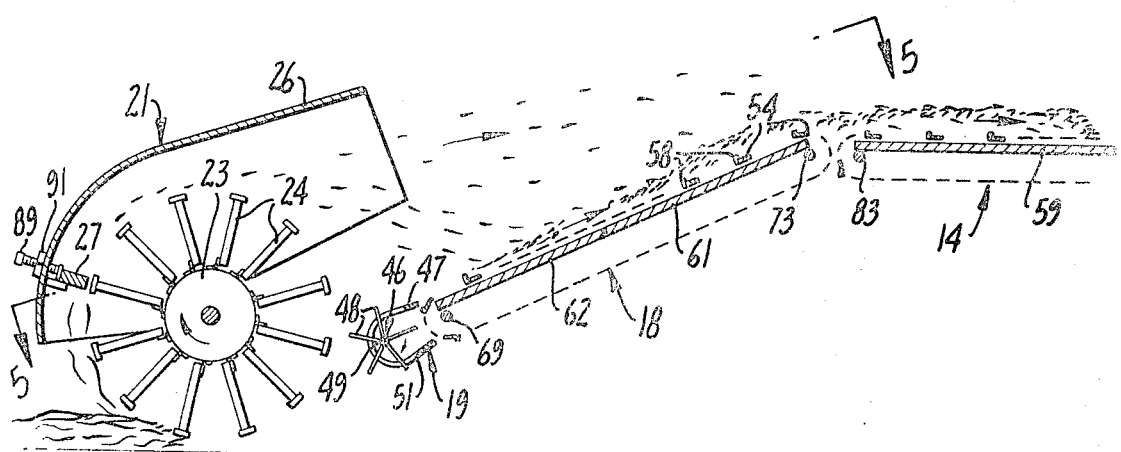
FIG. 2 is an enlarged cross-sectional elevational view of a portion of the apparatus of the present invention taken substantially along the plane of lines 2—2 of FIG. 1.

In the case of the second conveyor 18 the tined reel 46 is rotated in a clockwise direction as seen in FIG. 2 by a drive belt 43 leading to a pulley 52 attached to the distal end of the second conveyor 18. As may best be seen in FIGS. 2 and 9 the pickup reel 19 picks up forage material and places it on the second conveyor 18. In doing so, the tines 48 move out from beneath the hood 47 on the underside of the pickup reel 19, engage the forage, and pull it around to the top side of the reel 19 and toward the upper flight of the second conveyor 18. The tines 48 then disengage from the forage material by passing beneath the hood 47. The pickup reel 42 attached to the creeper structure 16 rotates in the direction opposite to the direction of the pickup reel 19 to feed forage material in a similar fashion to the underside of the creeper structure 16.

The framework 22 which supports the second conveyor 18 and the beater blower apparatus 21 is pivotally mounted to the wagon chassis 12 at approximately the level of the floor of the wagon so that it may be moved about the point of its pivotal attachment in the same plane as the creeper structure 16 moves. Motive force is applied to the framework 22 by a motive means 53, which may be a hydraulic or pneumatic cylinder extending between the chassis 12 and the framework 22. Four different pivotal positions of the second conveyor 18 and its framework 22 may be seen in FIGS. 3, 4 and 9, corresponding to different modes of operation of the forage handling wagon.

The conveyors 14 and 18 each comprise a plurality of spaced parallel elongate bar-like members 54 extending in a direction transverse to the wagon 11. The members 54 are attached at either end to drive chains 56 and 57 in the first conveyor 14 and second conveyor 18 respectively. Each of the bar members 54 is formed with a short upstanding portion 58 to engage the forage material. In the first conveyor 14 the bar members 54 move along a floor 59, and in the second conveyor 18 the bar members 54 similarly move along a floor 61. The forage material is prevented from falling between the bar members 58 by the floors 59 and 61.

In the second conveyor 18 a movable portion 62 of the floor may be retracted longitudinally of the second conveyor by a motive means 62, which may be a pneumatic or hydraulic cylinder, to allow the forage material to drop between the bar members 54. The movable portion 62 is located adjacent the distal end of the second conveyor 18, and a third conveyor 64 lies within the second conveyor 18 beneath the portion of the floor opened up by the retraction of the movable portion 62. The third conveyor 64 runs transversely of the second conveyor 18 and the wagon 11 to deliver forage material when desired to the side of the wagon.

Figure 5:
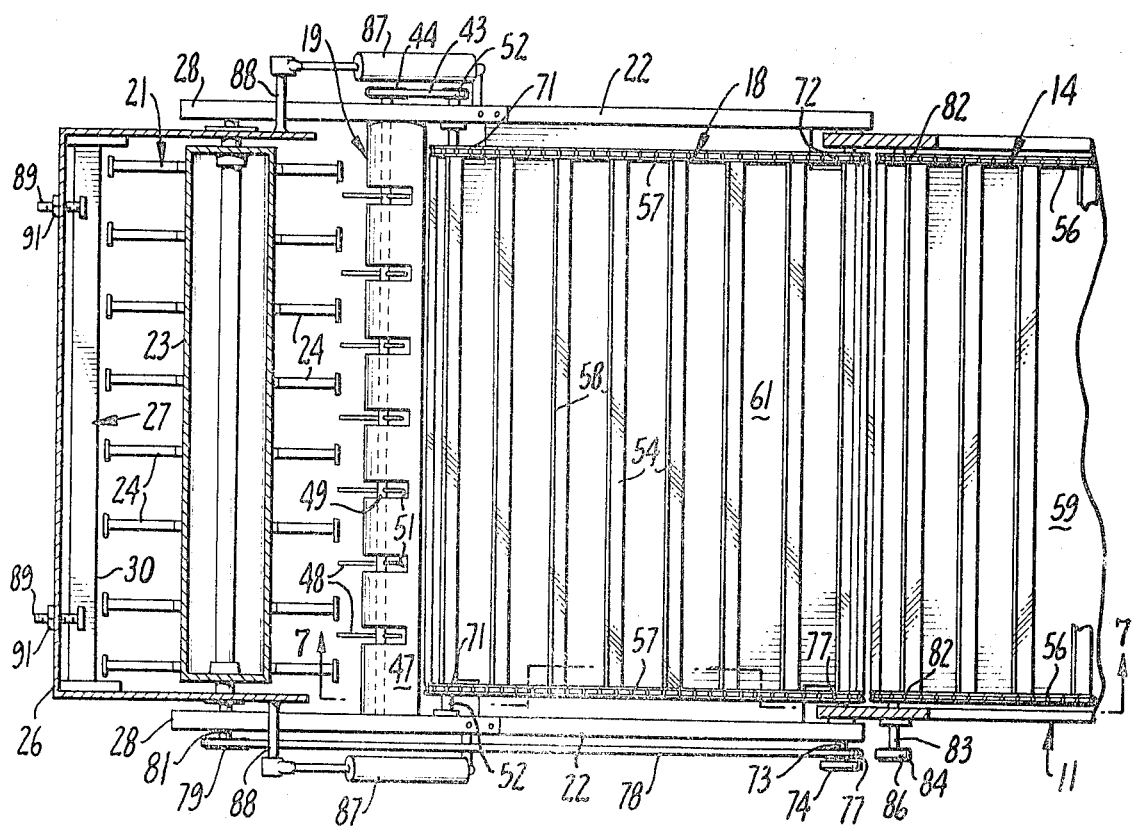
FIG. 5 is a fragmentary cross-sectional view taken substantially along the planes of lines 5—5 of FIG. 2.

The third conveyor 64 includes a flexible endless belt member 66 carried by a pair of guide rollers 67. One of the guide rollers 67 has its axle attached to one member of a right angle gear pair 68, and the other member of the gear pair 68 is attached to the shaft 69 which carries the sprocket 71 guiding the chains 57 at the distal end of the second conveyor 18. The shaft 69 also carries the pulley 52 for driving the pickup reel 19 through drive belt 43, as may be seen in FIG. 5.

The pair of sprockets 72 located at the pivotal end of the second conveyor 18 are attached to a shaft 73 to which is also attached a pulley 74. From the pulley 74 a drive belt 76 extends to the motive means 17. Another pulley 77 is also mounted on the shaft 73 and engaged with a drive belt 78. The drive belt 78 extends to a pulley 79 mounted on the shaft 81 which carries and drives the beater reel 23. The first conveyor 14 is driven through a pair of sprockets 82 attached to a shaft 83 which also carries a pulley 84. From the pulley 84 a drive belt 86 extends to the motive means 17 to operate the conveyor 14.

Figure 3:
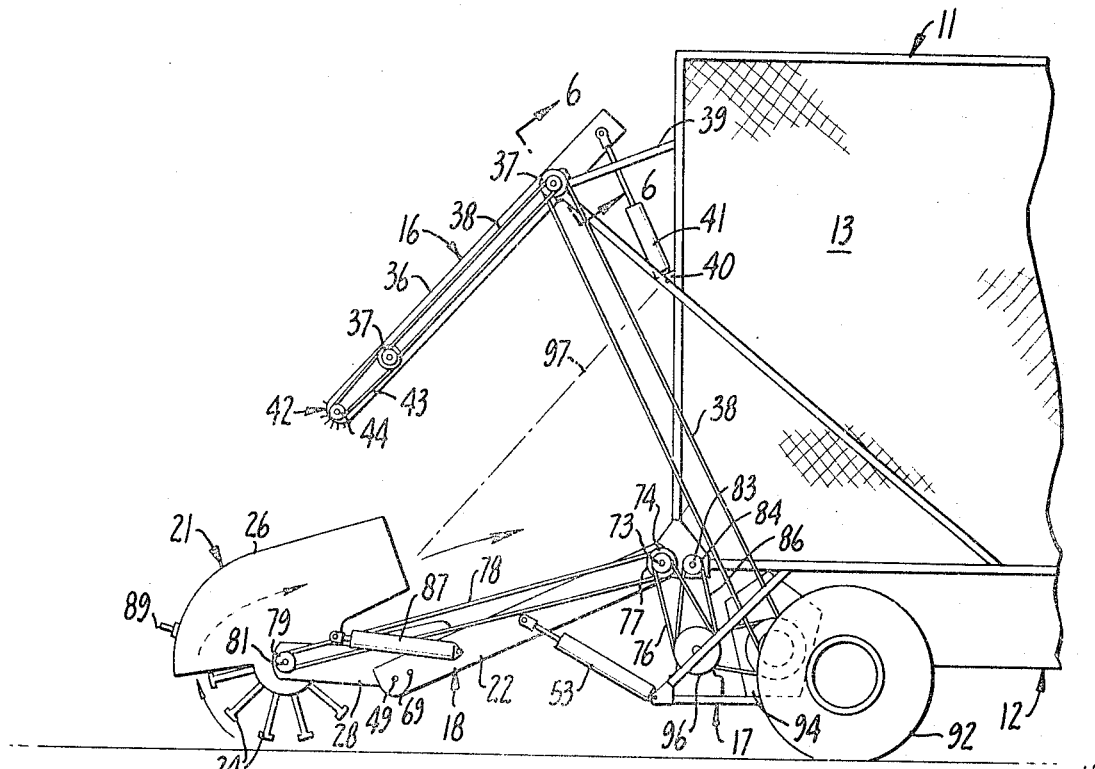
FIG. 3 is a partial side elevation view of the apparatus of the present invention in the loading mode of operation.
Figure 4:
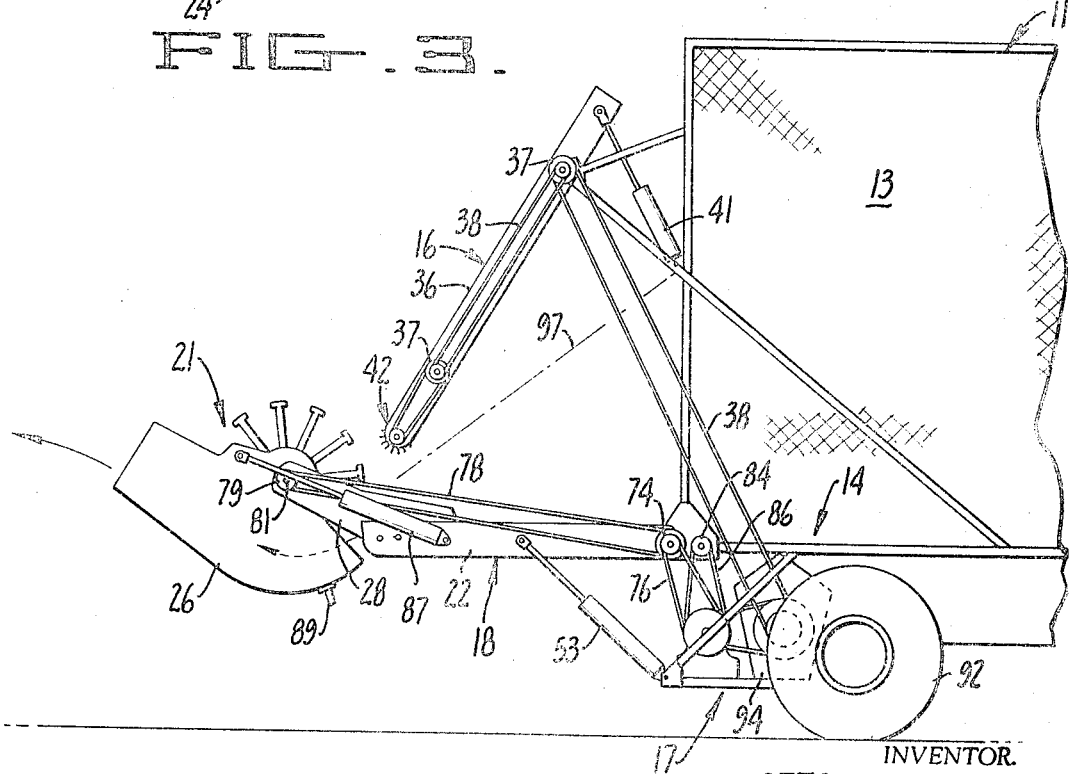
FIG. 4 is a partial side elevation view of the apparatus of the present invention in the discharging mode of operation.

The hood structure 26 of the beater blower apparatus 21 is journaled on the shaft 81 to pivot around the axis of the beater reel 23 from a position in which it deflects forage material picked up by the beater reel 23 into the body of the wagon as shown in FIG. 3 to a position in which it deflects forage material picked up by the beater reel 23 away from the body of the wagon 11 as shown in FIG. 4. The hood structure 26 is pivoted between these positions by a motive means 87 which may be a hydraulic or pneumatic cylinder extending between the framework 22 and an arm 88 attached to the hood structure 26. The breaker means 27 in the beater-blower apparatus 21 comprises a longitudinally extending bar member 30 extending radially inward from the hood structure 26 and is adjusted by means of a pair of jack screws 89. Nuts 91 are threaded on the jack screws 89, and adjustment of the nuts 91 along the jack screws 89 adjusts the radial distance of the breaker means 27 from the beater reel 23. The closer the breaker means 27 is to the beater reel 23 the finer the degree of comminution of the forage material by the action of the beater elements 24 in combination with the breaker means 27.

The chassis 12 is equipped with wheels 92, which may be steered in opposed directions for additional mobility and driven by the motive means 17 to propel the wagon. A driver's cockpit 93 is provided at the front end of the wagon 11 near the top so that the wagon operator may have a clear view of all operations. Steering and control linkages (not shown) and fluid control valves (not shown) are located in the cockpit 93 to enable the operator to control the wagon and its operations. As here shown, an engine schematically indicated at 94 operates the motive means 17, which may also include an appropriate transmission 96 having reversing gears for reversing the motion of the first and second conveyors 14 and 18, and the necessary interconnecting belts and pulleys.

To assist in containing the forage material propelled into the wagon 11 by the blower 21, side curtains 97 extend between the vertical edge of the side members 13 and the second conveyor 18 as shown by the dotted outline in FIGS. 3 and 4. The side curtains 97 may be made of a durable and flexible material such as canvas fabric, and may have a provision for taking a tuck in them to shorten them when the second conveyor 18 and the beater blower apparatus 21 are raised from the lower position shown in FIG. 3 to the raised position shown in FIG. 4.

Figure 7:
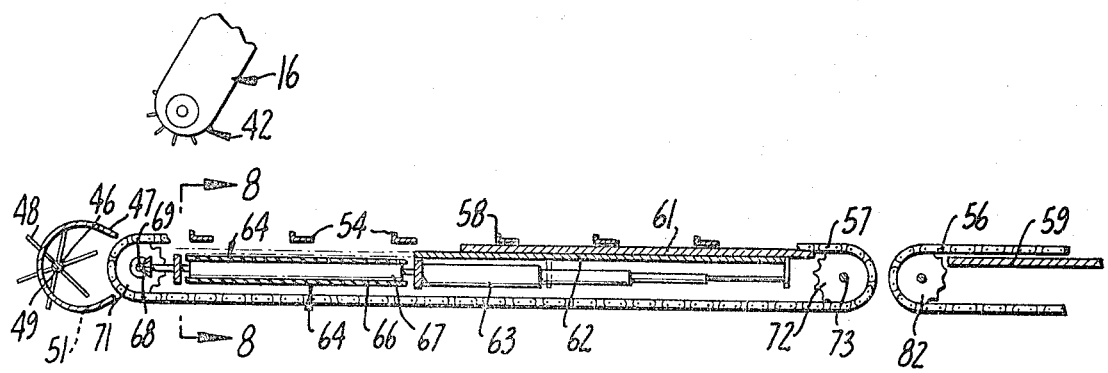
FIG. 7 is a cross-sectional view of an enlarged scale taken substantially along the plane of lines 7—7 of FIG. 5.
Figure 8:
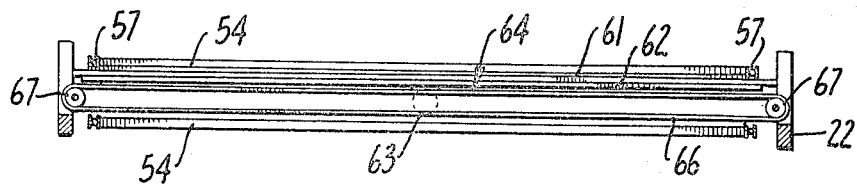
FIG. 8 is a cross-sectional view taken substantially along the plane of line 8—8 of FIG. 7.

An important feature of the wagon 11 of the present invention is the flexibility of interchange of its modes of operation. Among these modes of operation are loading the wagon with forage material picked up from the ground by the beater-blower apparatus 21 as shown in FIGS. 2 and 3, unloading the wagon either in the field or to storage by means of the beater-blower apparatus 21 as shown in FIG. 4, loading the wagon from a stack of forage material as shown in FIG. 9, and en masse unloading of the wagon by means of the movable end wall 29 and the first conveyor 14. The wagon 11 may also unloaded slowly in the type of operation known as field feeding, with the forage material being delivered to the side of the wagon by the third conveyor 64 illustrated in FIGS. 7 and 8.

In the beater blower mode shown in FIGS. 2 and 3, the wagon 11 picks up forage material in the field, usually from a windrow or other pile of forage material. The entire wagon 11 is driven in the general direction of the windrow or pile of forage material and the beater-blower 21 is operated to engage the material, comminute it against the breaker means 27 and propel it into the body of the wagon 11 between the side members 13. In this mode of operation the creeper apparatus 16 is not used and is swung up out of the way as shown in FIG. 3. It would not usually be necessary to operate the first conveyor means 14 to carry the forage farther back in the wagon, but it might prove useful to operate the second conveyor means 18 as shown in FIG. 2 to assist in lifting the forage material which is not sufficiently propelled by the beater-blower apparatus 21 into the body of the wagon 11. Rotary power is applied to the beater-blower apparatus 21 through drive belts 76 and 78 leading from the transmission 96 under the control of the operator in the cockpit 93. The beater-blower apparatus 21 may be raised and lowered as necessary to meet the contours of the ground by means of the fluid operated cylinder 53, likewise under the control of the operator.

The wagon 11 may be unloaded at a fairly rapid rate either in the field or in the storage area when the beater-blower unloading mode of operation shown in FIG. 4 is used. In this mode, the first and second conveyors 14 and 18 are operated to move the forage material out of the body of the wagon toward the beater-blower apparatus 21. The beater-blower apparatus 21 is elevated by means of the fluid actuated cylinder 53 and the hood structure 26 is pivoted counterclockwise as seen in FIG. 4 by the operation of the fluid actuated cylinder 87 to aim the discharge of the beater-blower apparatus 21 away from the wagon 11. The beater reel 23 of the beater-blower apparatus 21 continues to rotate in a clockwise fashion as viewed in FIG. 4 in this mode of operation, engaging the leading edge of the forage material propelled toward it by the second conveyor 18 and propelling the forage material downward and then away from the wagon as shown in FIG. 4.

In this mode of operation, the creeper apparatus 16 is swung downward toward the second conveyor 18 and the beater-blower apparatus 21 and operated through drive belt 38 and drive belt 43 to restrain the rate of advance of the forage material toward the beater-blower apparatus 21. To do so the creeper apparatus is driven in its usual direction, that is tending to propel the forage material back in toward the body of the wagon, thus reducing the amount of forage material presented at the leading edge of the body of forage material to the beater-blower apparatus 21. Excess forage material which would otherwise jam up the beater-blower apparatus 21 thus travels a roughly circular path between the second conveyor 18, creeper structure 16 and back into the body of the wagon 11 to be brought forward to the beater-blower apparatus once again by the action of the second conveyor 18 and the first conveyor 14.

The beater-blower unloading mode of operation may be used to stack material in the field, to blow forage material on top of a stack already made in the field, thus building the stack higher, or to unload the forage from the wagon into bins or trucks as desired. This mode of operation may also be used in combination with the en masse unloading mode of operation of the wagon described above in which the movable end wall 29 is opened and the first conveyor operated to draw the forage in the direction of the movable end wall 29 as the wagon is driven away from the unloading site. After one wagon load has been placed by the en masse technique, additional forage material may be placed atop that previously unloaded by the use of the beater-blower 21 in the mode shown in FIG. 4.

To load the wagon 11 from a tall stack of forage material, as in the storage area, and to load the wagon in the field when the comminuting action of the beater-blower 21 is undesirable, the wagon is operated in the stack-loading mode shown in FIG. 9. To convert the wagon 11 to this mode of operation, the beater-blower apparatus 21 is removed by disengaging the arms 28 from the framework 22 of the second conveyor 18 and disconnecting the cylinder 87 and drive belt 78 leading to the beater-blower. This disconnection leaves only the second conveyor 18 and its pickup reel 19 attached to the framework 22.

In this mode of operation the creeper structure 16 is swung up and down by means of its actuating cylinder 41 and operated through the drive belt 38 to attack the upper part of the stack of forage material. As the level of the stack is lowered, the creeper structure 16 is lowered appropriately. Forage material removed from the stack by the creeper structure 16 is drawn toward the body of the wagon 11 and also drops downward toward the second conveyor 18 and its pickup reel 19, which in turn are driven through drive belt 76 to pick up forage material from the ground and the lower portion of the stack. Skilled operation of the creeper structure 16 will then be seen to regulate the rate at which forage material is chewed from the stack to be dropped on the second conveyor 18 and its pickup reel 19, with the teeth of the creeper structure 16 tending themselves to move the forage material into the body of the wagon by their reciprocation.

The control over the rate of supply of forage to the second conveyor 18 and its pickup reel 19 tends to prevent jam-up and uneven operation. With this mode of operation, forage material may be loaded into the wagon smoothly and efficiently from a stack of material even taller than the wagon.

The wagon 11 may also be used for the slow discharge of forage material in field and feedlot feeding. For this operation, shown in FIGS. 7 and 8, the second conveyor 18 is raised to a substantially level position. The movable portion 62 of the floor 61 which covers the third conveyor 64 is retracted by means of cylinder 63. The first conveyor 14 and the second conveyor 18 are then operated to draw forage material from the body of the wagon 11 along the floor 59 of the first conveyor and the floor 61 of the second conveyor until the forage material reaches the space opened by up the retraction of the movable portion 62. The forage material then falls through between the bar-like members 54 onto the bed of the third conveyor 64. The third conveyor 64 is operated to move the forage material to the side of the wagon and dump it off gradually over the edge of the second conveyor 18. In this way, the wagon 11 is not driving over the forage material that it has just discharged. If it is necessary to restrain the rate of feeding of the forage material to the third conveyor 64 in this mode of operation the creeper structure 16 may be pivoted downward to a position similar to that used in the blower unloading mode shown in FIG. 4. The creeper structure 16 and its pickup reel 42 may then be operated to pull excess forage material back into the body of the wagon as described in connection with the blower unloading mode of operation shown in FIG. 4.

In addition to the previously described modes of operation, the wagon 11 may be used to load additional material onto an already formed stack without comminution by raising the second conveyor 18 to a position such as is shown in phantom in FIG. 9, and raising the creeper structure 16 correspondingly. The motions of the second conveyor 18 and of the creeper structure 16 are reversed, so that both tend to convey forage away from the body of the wagon. By this technique, forage may be elevated a considerable distance in the air to top off a stack. If necessary to facilitate this form of operation, the creeper 16 may be relocated with the crankshaft 34 about which the creeper 16 pivots journaled in brackets 98 located at the top of the side members 13. The cylinder 41 is also relocated in this event, from the bracket 40 to a bracket 99 higher on the side member 13. The cylinder would then extend to the right of vertical as seen in FIG. 9, retaining the same point of attachment to the framework 36 of the creeper.

From the foregoing it will be seen that the forage handling wagon of the present invention combines in one piece of equipment the functions of picking up forage material in the field in whole or comminuted form, discharging it to storage and discharging it for field and manger feeding at an even rate. The wagon has great versatility in the modes of its loading and unloading and the sources from which and to which it may load and unload forage material. Due to the width of its conveyor members, it is capable of picking up the windrow of forage material substantially as wide as the wagon, and it does not run over forage material on the ground either in loading or unloading the forage material.

I claim:

1. A self-propelled forage handling wagon, comprising a wheeled chassis having upright forage-retaining side members and a floor, a conveyor extending the width of the chassis between said upright side members along the floor of the wagon, a creeper structure mounted on said side members at the top of the wagon adjacent one end of the wagon for pivotal motion about a horizontal axis transverse to the wagon, said creeper structure having a generally planar forage-engaging surface extendable and operable in a horizontal plane and above the point of said pivotal motion, and motive means for propelling said chassis, creeper structure and conveyor whereby the wagon may be propelled in the direction of a stack of forage and said creeper structure and said conveyor operated to draw the forage into the wagon and the forage may be discharged from the wagon by operation of the conveyor.

2. A forage handling wagon as described in claim 1 and wherein said creeper structure comprises a plurality of elongated elements aligned generally parallel to each other to form said generally planar surface and mounted for reciprocation longitudinally and perpendicularly of the plane of said structure, each element having forage-engaging fingers attached along a portion of its length and projecting toward one side of said plane, and means for reciprocating said elements to draw forage toward the pivotal end of said creeper structure.

3. A forage handling wagon as described in claim 2 and wherein said means for reciprocating said elements comprises a pair of spaced parallel crankshafts journaled for rotation about horizontal axes transverse to the wagon, and each of said elongated elements is journaled adjacent each of its ends to one of said crankshafts for reciprocation thereby, whereby said elongated elements and said fingers will be oscillated both longitudinally and perpendicularly of the general plane of said creeper apparatus by rotation of one of said crankshafts, the perpendicular oscillation of said elements and fingers in the direction of projection of said fingers serving to engage said fingers with the forage material, the perpendicular oscillation of said elements and fingers in the direction opposite the direction of projection of said fingers serving to clear the fingers of forage material, and the longitudinal oscillation of said elements and fingers in the direction of the pivotal attachment of said creeper apparatus to the wagon serving to draw forage thereinto.

4. A forage handling wagon as described in claim 3 and wherein each of said crankshafts has offsets in two directions 180 degrees apart about the axis of the crankshaft.

5. A forage handling wagon as described in claim 2 and wherein said creeper apparatus includes a fluid-actuated cylinder for imparting pivotal motion to said creeper apparatus about the point of pivotal attachment of the creeper apparatus to the wagon.

6. A forage handling wagon as described in claim 2 and wherein said creeper apparatus includes a pickup reel mounted at the distal end thereof, said pickup reel comprising a tined reel journaled on said creeper apparatus for rotation about an axis lying generally in the plane of the creeper apparatus and disposed generally transverse thereto and extending the full transverse width of the creeper apparatus, and a hood member disposed around a portion of the circumference of said tined reel along its length, the center of curvature of said hood member being offset from and parallel to the axis of said tined reel, said hood member being slotted circumferentially for passage of said tines therethrough, whereby rotation of said tined reel within said hood member will cause said tines to project through said hood member for a portion of the circumference of the hood member and to pass beneath the hood member for another portion of the circumference, the projection of said tines from said hood member serving to engage forage material and the passage of said tines beneath said hood member serving to disengage the forage from the tines.

7. A forage handling wagon as described in claim 1 and wherein said wagon includes a second conveyor of width equal to the wagon and having one end attached to said chassis adjacent the end of the wagon to which said creeper structure is attached for pivotal motion of said second conveyor in a vertical plane about a horizontal axis transverse to the wagon and operable by said motives means to convey forage to and from said first conveyor.

8. A forage handling wagon as described in claim 7 and wherein said second conveyor includes a pickup reel mounted at the distal end thereof, said pickup reel comprising a tined reel journaled on said second conveyor for rotation about an axis generally transverse to said wagon and extending the full width of said second conveyor, and a hood member disposed around a portion of the circumference of said tined reel along its length, the center of curvature of said hood member being offset from and parallel to the axis of said tined, reel said hood member being slotted circumferentially for passage of said tines therethrough, whereby rotation of said tined reel within said hood member will cause said tines to project through said hood member for a portion of the circumference of the hood member and to pass beneath the hood member for another portion of the circumference.

9. A forage handling wagon as described in claim 7 and wherein said second conveyor includes means for imparting pivotal motion to said second conveyor about the point of its pivotal attachment to the wagon.

10. A forage handling wagon as described in claim 7 and wherein said wagon includes a third conveyor located adjacent to and below the distal end of said second conveyor and oriented transverse to said second conveyor for discharging forage to the side of the wagon, and motive means for operating said third conveyor.

11. A forage handling wagon as described in claim 1 and wherein a movable end wall is attached to the end of the wagon opposite a second conveyor member and is movable between a position closing off said end of the wagon and a position opening said end of the wagon.

12. A forage handling wagon as described in claim 11 and wherein motive means is provided for moving said end wall between said closing and opening positions.

13. A self-propelled forage-handling wagon, comprising
a wheeled chassis having upright forage-retaining side members and a floor,
a first conveyor extending the width of said chassis between said upright side members along the floor of the wagon,
a beater-blower apparatus comprising
a framework pivotally mounted upon said chassis adjacent one end of said first conveyor for pivotal motion in a vertical plane about a horizontal axis transverse to the wagon,
a beater reel extending substantially the width of the wagon mounted on the distal end of said framework for freedom of rotation about a horizontal axis and having radially extending beater elements attached thereto for engaging forage, comminuting it and projecting it tangentially of said beater reel,
a hood structure enclosing a portion of said beater reel for deflecting forage in a desired direction from said beater reel, and
breaker means mounted in said hood structure and cooperating with said beater elements to comminute the forage, said breaker means comprising a longitudinally extending bar member extending radially inward from said hood structure, and
motive means for propelling the wagon and operating said first conveyor and said beater-blower apparatus.

14. A forage handling wagon as described in claim 13 and wherein the radial distance of said breaker means from said beater reel is adjustable to control the degree of comminution of the forage.

15. A forage handling wagon as described in claim 13 and wherein the wagon includes a second conveyor of width substantially equal to the width of the wagon and operated by said motive means, said second conveyor having one end thereof attached to said chassis adjacent one end of said first conveyor for freedom of pivotal motion in a vertical plane about a horizontal axis transverse to the wagon and operable by said motive means to carry forage from said first conveyor to said beater-blower apparatus, said hood structure being pivotable about the axis of said beater reel from a position deflecting forage into the wagon to a position accepting forage from said wagon along said second conveyor and discharging said forage away from the wagon.

16. A forage handling wagon as described in claim 13 and wherein said wagon includes a creeper structure mounted on said side members adjacent the top of the wagon and the end of the wagon to which said beater-blower apparatus is attached for freedom of pivotal motion in a vertical plane about a horizontal axis transverse to the wagon and operated by said motive means to draw forage toward the wagon.

17. A forage handling wagon as described in claim 13 and wherein the wagon includes a movable end wall attached to the end of the wagon opposite said beater-blower apparatus and movable between a position closing off said end of the wagon and a position opening said end of the wagon, and motive means for moving said wall between said closing and opening positions.

18. A forage handling wagon as described in claim 16 and wherein said creeper structure comprises a plurality of elongated elements aligned generally parallel to each other to form a substantially planar structure and mounted for reciprocation longitudinally and perpendicularly of the plane of the creeper structure, each element having forage-engaging fingers along a portion of its length and projecting from one side of the plane, and means for reciprocating said elements.

19. A forage handling wagon as described in claim 18 and wherein said creeper structure includes a pickup reel mounted at the distal end thereof, said pickup reel comprising a tined reel journaled on said creeper structure for rotation about an axis lying generally in the plane of the creeper structure and disposed generally transverse thereto and extending substantially the width of the creeper structure, and a hood member disposed around a portion of the circumference of said tined reel along its length, the center of curvature of said hood member being offset from and parallel to the axis of said tined reel, said hood member being slotted circumferentially for passage of said tines therethrough, whereby rotation of said tined reel within said hood member will cause said tines to project through said hood member for a portion of the circumference of the hood member and to pass beneath the hood member for another portion of the circumference.

20. A forage handling wagon as described in claim 15 and wherein said second conveyor includes means for imparting motion to said second conveyor about the point of its pivotal attachment to the wagon.

References Cited

UNITED STATES PATENTS

| | | | |
|---|---|---|---|
| 968,656 | 8/1910 | Haines | 56—355 |
| 1,346,433 | 7/1920 | Varland. | |
| 1,917,368 | 7/1933 | Hauge | 198—10 |
| 1,932,771 | 10/1933 | Davidson | 56—362 |
| 2,615,295 | 10/1952 | Sishc | 56—345 |

FOREIGN PATENTS

| | | |
|---|---|---|
| 1,331,178 | 5/1963 | France. |
| 399,816 | 4/1966 | Switzerland. |

LOUIS G. MANCENE, Primary Examiner

J. A. OLIFF, Assistant Examiner

U.S. Cl. X.R.

56—351, 355, 358